A. H. UNDERWOOD.
Cooking Attachments to Coal-Oil Stoves.
No. 199,671. Patented Jan. 29, 1878.
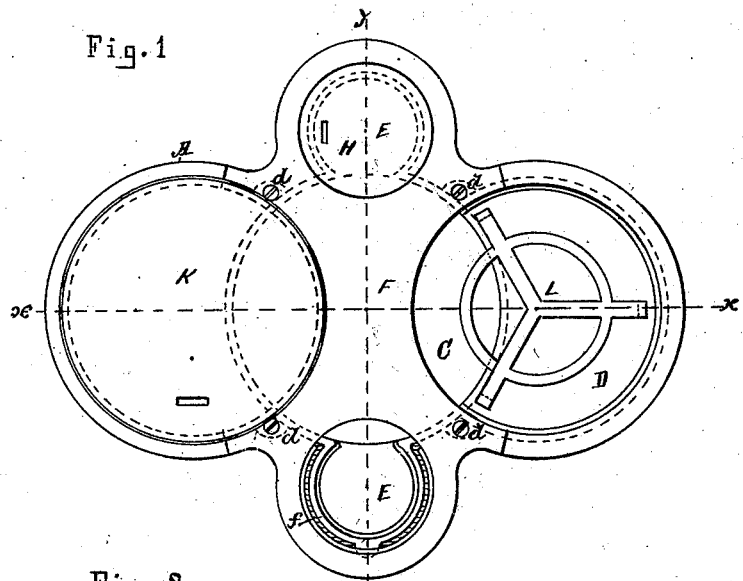
Fig. 1
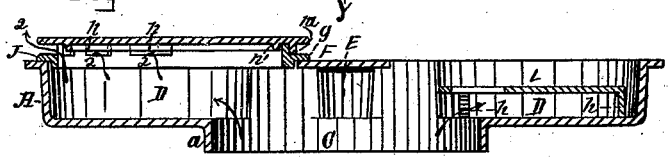
Fig. 2
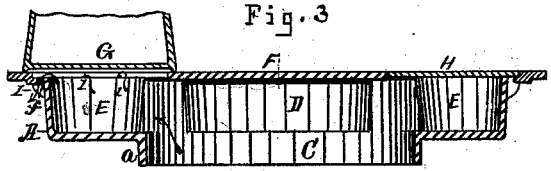
Fig. 3
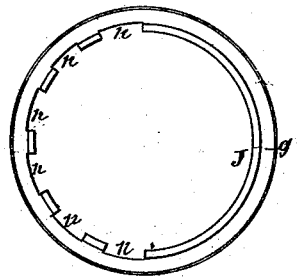 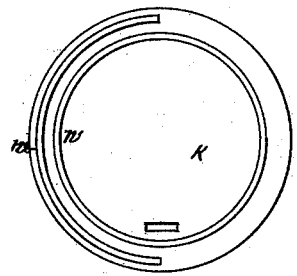
Fig. 4   Fig. 5
WITNESSES:
J. C. Wilcke
N. H. Sherburne
INVENTOR:
Amos H. Underwood
By Gridley & Sherburne
Attorneys

UNITED STATES PATENT OFFICE.

AMOS H. UNDERWOOD, OF DUNDEE, ASSIGNOR OF ONE-HALF HIS RIGHT TO NORMAN H. SHERBURNE, OF CHICAGO, ILLINOIS.

IMPROVEMENT IN COOKING ATTACHMENTS TO COAL-OIL STOVES.

Specification forming part of Letters Patent No. 199,671, dated January 29, 1878; application filed July 6, 1877.

*To all whom it may concern:*

Be it known that I, AMOS H. UNDERWOOD, of Dundee, in the county of Kane and State of Illinois, have invented new and useful Improvements in Cooking Attachments to Coal-Oil Stoves; and I do hereby declare the following to be a full, clear, and exact description thereof, which will enable others skilled in the art to which my invention appertains to make and use the same, reference being had to the accompanying drawings, forming part of this specification, in which—

Figure 1 represents a general plan or top view of a cooking attachment to coal-oil stoves embodying my said invention. Fig. 2 represents a central sectional elevation of the same, taken on a line, *x x*, drawn across Fig. 1; and Fig. 3 represents a transverse sectional elevation taken on the line *y y*. Fig. 4 represents a general plan or top view of the ventilating-ring, and Fig. 5 represents an inverted plan of the cover for the same.

Like letters of reference indicate like parts.

My invention relates to that class of cooking attachments used upon the heating-drum of coal-oil stoves for supporting the cooking utensil, so as to bring the same in contact with the products of combustion. The object of my invention is to so construct such attachments that several cooking utensils may be heated at the same time.

To that end my invention consists in the arrangement of the several parts, as hereinafter more fully described and claimed.

In the drawing, A represents a cast-metal cap or top, which is provided with an opening, C, formed through its lower surface centrally between its ends, and having a depending flange, *a*, around the said opening, as shown in Figs. 2 and 3, and which flange is of the proper diameter to fit loosely around the upper end of the heating-drum of the stove, so as to hold the said cap in a fixed position upon the said drum.

D D are circular heating-chambers, which are formed in the top A, on opposite sides of the opening C, and communicating with the same, and are of the proper diameter to allow the lower portion of the cooking utensils to loosely enter them, so as to leave a slight space between the periphery of the cooking utensils and the inner surface of the walls of the chamber, and are of the proper depth to leave a space between the bottom of the cooking utensil and lower wall or bottom of the chamber when the enlarged portion of the cooking utensil is resting upon the upper edge of the side walls of the chamber.

E E are supplemental heating-chambers, which are also formed in the top A, on opposite sides of the opening C, and centrally between the chambers D D, as shown in Fig. 1, and are so arranged as to communicate with the said opening.

F is a center plate, which is permanently secured to the upper edge of the walls of the chambers D D by screws or rivets *d*, as shown in Fig. 1, and is provided at each end with an annular opening, formed through the same immediately over the respective supplemental chambers E E. The diameter of these openings is slightly greater than the diameter of the respective chambers E E, so as to leave a space, *f*, between the outer surface of the wall of the chambers and the wall of the openings, through which the heated air can pass, as indicated by arrows 1, when the opening in the plate is closed by a vessel or cooking utensil placed over the same, as shown at G, Fig. 3, the object of which is to produce a sufficient draft to cause the heated air escaping from the heating-drum of the stove to pass into the said chambers, and under the vessel placed over the opening in the plate.

H is a removable cover, which is of the proper diameter to fit loosely into the opening in the plate, and rest upon the side wall of the respective chambers E E, so as to close the said chambers and the space *f* when desired.

The sides of the plate F are cut away, so as to describe the arc of a circle corresponding with the circle described by the side walls of the chambers D D, and so that when the said plate is secured in position the opening in the respective chambers will describe a true circle.

J is an annular metal ring, which is of the proper diameter to fit loosely into the opening in the respective chambers D D, and is provided on its outer surface, at a point near its center, with an outward-projecting flange, *g*, arranged to rest upon the upper edge of the walls of the chambers and upper surface of the plate F, as shown in Fig. 2. This ring is provided upon one side of its center with a series of openings, n, formed through the upper edge above the flange g, through which openings the heated air can pass, as indicated by arrows 2, when the central opening is closed by the cooking utensil resting upon the upper edge of the ring, the object of which is to cause the heated air escaping from the heating-drum of the stove to be drawn into the said chambers and under the vessel placed upon the ring.

K is a cast-metal lid or cover, which is of the proper size to cover the opening in the respective chambers D, and is provided on its lower surface with an annular depending flange, n', which is of the proper diameter to fit loosely into the opening in the ring J, and of the proper thickness to extend downward into the opening in the said ring sufficient to prevent the cover from being displaced laterally. The said cover is also provided with a semi-annular flange, m, which fits against the outer surface or periphery of the ring J, and rests upon the flange g of the ring, as shown in Fig. 2. The arrangement of the flange m is such as to tightly close the openings n in the ring J when the cover K is turned to the proper position to bring the said flange over or against them, the object of which is to admit of opening or closing the said openings by turning the cover so as to change the flow of the heated air from one heating-chamber into another, as may be required.

L is a removable disk, arranged to loosely enter the respective heating-chambers D D, and is provided at its outer edge with pendants h h, arranged to rest upon the lower wall of the heating-chambers, and so as to hold the disk proper slightly above the bottom of the chamber, as shown in Fig. 2, the object of which is to form a support for cooking utensils which are too small to rest upon the walls of the chamber, and so as to hold such utensils above the bottom of the chamber a distance sufficient to admit the heated air under them.

By reference to the drawing it will be seen that the area of the respective heating-chambers E E is much less than the area of the heating-chambers D D, the object of which is to admit of heating small vessels, and keeping them warm when the chambers D D are being used for larger vessels.

Having thus described my invention, what I claim as new, and desire to secure by Letters Patent, is—

1. The removable top A of a coal-oil stove, provided with the central opening C, heating-chambers D D, and one or more supplemental chambers, E E, of less diameter than the chambers D D, and provided with the ventilating-opening f, substantially as and for the purpose specified.

2. The removable top A of a coal-oil stove, provided with the central opening C, and one or more heating-chambers, E, the wall of said chamber or chambers being so arranged as to form the air-space f between them and the top plate F, substantially as and for the purpose specified.

3. The combination, with the removable top A of a coal-oil stove, provided with the central opening C, and one or more heating-chambers, D D, of the removable ring J, having the openings n formed therein, substantially as and for the purpose specified.

4. The combination, with the heating-chambers D D in the removable top A of a coal-oil stove, of the ring J and flanged cover K, substantially as and for the purpose specified.

AMOS H. UNDERWOOD.

Witnesses:
  N. H. SHERBURNE,
  J. C. WELCKE.